UNITED STATES PATENT OFFICE.

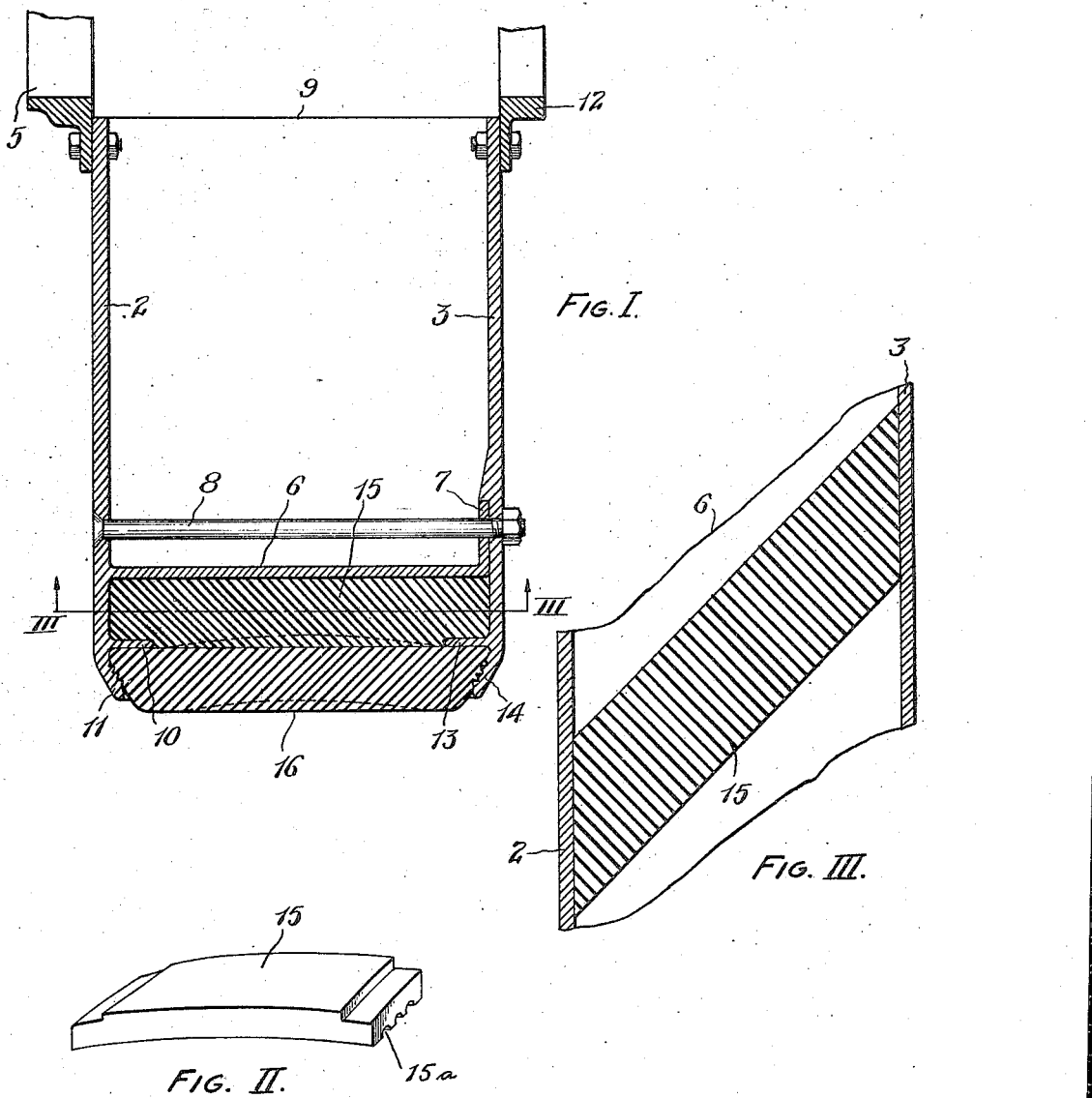
J. R. McFALL.
WHEEL FOR POWER PROPELLED VEHICLES.
APPLICATION FILED MAY 16, 1919.
1,424,367.
Patented Aug. 1, 1922.
INVENTOR:
JAMES R. McFALL
BY HIS ATTY

JAMES R. McFALL, OF CLEVELAND, OHIO.

WHEEL FOR POWER-PROPELLED VEHICLES.

1,424,367.

Specification of Letters Patent.   Patented Aug. 1, 1922.

Application filed May 16, 1919. Serial No. 297,581.

*To all whom it may concern:*

Be it known that I, JAMES R. McFALL, a citizen of the United States of America, residing at Cleveland, in the county of Cuyahoga and State of Ohio, have invented certain new and useful Improvements in Wheels for Power-Propelled Vehicles; and I hereby declare the following to be a full, clear, and exact description of the invention, such as will enable others skilled in the art to which it pertains to make and use the same.

This invention relates to improvements in wheels for power propelled vehicles.

The object of my invention is to provide a wheel suitable for automobiles, trucks, trailers and similar vehicles, and it consists in providing a wheel having a new and improved construction of rubber tire.

Figure I is a radial section of a wheel embodying my improved tire.

Figure II shows one of the blocks of the inner tire.

Figure III is a section on line III—III of Figure I.

Referring to the drawings, 2 represents one side of the wheel proper, and 3 represents the opposite side. The side 2 comprises a circular plate having a central opening for the hub flange shown at 5. The rim of the wheel is shown at 6, and this rim is preferably formed integral with the side 2, and the said rim is also provided with an annular perpendicular flange 7 adapted to abut against the side 3. Bolts 8 pass through the sides 2 and 3 and through the flange 7. The spokes of the wheel are shown at 9 and consist of plates which extend from side to side of the wheel and are preferably formed integral with the side 2, and the rim 6. On the side 2 and spaced a distance outwardly from the rim 6, is formed an annular perpendicularly related flange 10 and outwardly from said flange 10, the rim of the side 2 is inclined inwardly to form a clincher arrangement, shown at 11, and the inner surface of this portion is roughened or corrugated to form teeth. The side 3 consists of a circular plate having a central opening where the hub flange 12 is bolted and is also provided with an annular flange 13, corresponding to and in line with the flange 10 on the side 2. The edge 14 of the side 3 is inclined inwardly to form the opposite member of the clincher arrangement and the inner surface thereof is similarly provided with teeth. The wheel is provided with a composite tire including two solid rubber tires, the inner tire being formed of a plurality of blocks 15 of soft rubber, and the outer tire comprising a continuous band of harder rubber 16. One of the blocks 15, is shown in Fig. 2 and all are fashioned with grooves 15ª extending the full length of the blocks and opening out at the ends to lessen the likelihood of the blocks sticking to the rim. The outer face of each block 15 is cut away or reduced towards each end to accommodate the flanges 10 and 13, which hold the said blocks in position.

The said blocks are in the form of acute angled parallelograms and are arranged around the rim at an angle of approximately 45 degrees to sides of the wheel. By placing the blocks at this angle around the rim they will yield as much in length as width. The said blocks are also placed with the forward points towards the front of the car at the inner side of the wheel so that any tendency of the rubber to flow rearwardly of the load upon the tread will go to the outer side of the wheel tending to build up the rubber at the outer side and thereby increasing or causing a slight fullness of the outer tire tread at the outer side of the wheel. This reduces the tendency to skid on the part of two of the wheels when turning corners. The clincher portions of the rim extend almost to the tread of the outer tire in order to prevent the rubber from spreading, flowing or being forced sidewise from the center. In this way the elastic nature of the rubber is preserved by preventing stretching sidewise or around the wheel. With the concaving of the center of the outer tire the blocks of the inner tire will yield thereby reducing the lengthwise stretching to a minimum and the concavity thus formed aids to produce a bite upon the roadway. Owing to the tires concaving in this manner a considerable part of the weight must be carried by the side portions of the tire, thereby causing the lateral edged portions of the tire to grip the road and increase the traction thereon. By this construction it is possible to equalize and distribute the load upon the outer tire crosswise of the tire and by reducing the flowing effect or piling up of the rubber ahead of the load less power is needed to overcome the load. In other words by my arrangement instead of producing a stretching effect of the rubber of the tire I produce a compacting or building up of the rubber at the points where the load comes heaviest and the strain is most severe.

What I claim is:

1. A wheel comprising the combination of a hub, a rim, a structure connecting said hub and rim, and a tire including inner and outer tires about said rim, said inner tire being composed of a series of circumferentially arranged sections, and distinct flanges carried by said rim for holding said tires in place, one pair of said flanges being interposed between said tires, said inner tire sections being oblique to the wheel axis.

2. A wheel comprising a structure including a hub, a rim and connecting means therebetween, and a tire including an inner tire composed of a plurality of oblique sections abutting said rim, and an integral outer tire enveloping said sections.

3. A wheel comprising a structure including a hub, a rim of channel shaped cross section, means connecting said hub and rim, a tire comprising a plurality of rubber blocks confined by said rim and having each a series of grooves opening out at each end, said grooves being opposed to said rim whereby to avoid sticking of such ends to such rim.

4. A wheel comprising a rim structure having on each side a pair of annular flanges, a composite rubber tire including inner tire sections oblique with reference to the wheel axis and confined against said rim by corresponding flanges one from each pair, said tire including an outer rubber tire enclosed between the two pairs of flanges and abutting said inner tire sections.

5. A wheel comprising a rim, a hub, spokes, and a tire including a pair of separate tires one disposed around said rim and the other around the first, the inner one of said tires being composed of sections oblique with reference to the wheel axis, said sections being separated from the outer tire by lateral flanges carried by said rim whereby the outer tire when under load is confined to the area in between said flanges.

6. A wheel comprising the combination of a rim, of a tire including solid crosswise extending inner tire sections arranged about said rim and disposed at an angle to the axis, flanges engaging said tire sections to hold them in place, said tire including also an outer tire enclosing said inner sections and distinct flanges on said rim for holding the outer tire in place.

7. A wheel comprising a rim, a tire including an inner series of solid rubber blocks arranged around the rim and disposed at an angle of approximately 45 degrees to the sides of the wheel, means carried by said rim for engaging and retaining said blocks in position, said tire including a continuous outer rubber tire arranged around said blocks, and separate means carried by said rim for holding said enveloping tire in place.

In testimony whereof, I sign the foregoing specification, in the presence of two witnesses.

JAMES R. McFALL.

Witnesses:
V. C. LYNCH,
RUDOLPH H. BENDER.